(12) United States Patent
Walton et al.

(10) Patent No.: US 8,213,484 B2
(45) Date of Patent: Jul. 3, 2012

(54) WIRELESS COMMUNICATION NETWORK WITH EXTENDED COVERAGE RANGE

(75) Inventors: Jay Rodney Walton, Carlisle, MA (US); Mark S. Wallace, Bedford, MA (US)

(73) Assignee: Qualcomm Incorporated, San Diego, CA (US)

( * ) Notice: Subject to any disclaimer, the term of this patent is extended or adjusted under 35 U.S.C. 154(b) by 1435 days.

(21) Appl. No.: 11/158,494

(22) Filed: Jun. 21, 2005

(65) Prior Publication Data

US 2006/0285604 A1    Dec. 21, 2006

Related U.S. Application Data

(60) Provisional application No. 60/691,871, filed on Jun. 16, 2005.

(51) Int. Cl.
*H04B 1/00* (2006.01)
(52) U.S. Cl. ........ 375/146; 375/147; 375/295; 375/316; 375/346; 375/130; 375/140
(58) Field of Classification Search .................. 375/295, 375/316, 146, 147, 346
See application file for complete search history.

(56) References Cited

U.S. PATENT DOCUMENTS

| | | | |
|---|---|---|---|
| 4,998,261 A | | 3/1991 | Van Driest et al. |
| 5,369,378 A | * | 11/1994 | Kosaka et al. ............ 332/104 |
| 5,712,870 A | * | 1/1998 | Petrick ..................... 375/147 |
| 5,852,630 A | * | 12/1998 | Langberg et al. ......... 375/219 |
| 6,175,550 B1 | | 1/2001 | Van Nee |
| 6,480,528 B1 | * | 11/2002 | Patel et al. ................ 375/148 |
| 6,665,348 B1 | | 12/2003 | Feher |
| 6,678,310 B1 | | 1/2004 | Andren et al. |
| 6,757,553 B1 | * | 6/2004 | English ..................... 455/562.1 |
| 6,882,679 B2 | | 4/2005 | Somayazulu et al. |
| 6,907,681 B2 | * | 6/2005 | Tanaka et al. ............. 36/77 R |

(Continued)

FOREIGN PATENT DOCUMENTS

EP    0755141 A2    1/1997

(Continued)

OTHER PUBLICATIONS

Hitoshi Takanashi Masahiro Morikura and Richard van Nee, NTT wireless systems Labs, Lucent Tenchnology Bell Labs, IEEE 802.11-98/72-r5, IEEE P802.11 Wireless LANs.*

(Continued)

*Primary Examiner* — Siu Lee
(74) *Attorney, Agent, or Firm* — Qualcomm Patent Group; Dmitry R. Milikovsky; James H. Yancey, Jr.

(57) ABSTRACT

A wireless communication network supports 802.11b/g and a range extension mode, which supports at least one data rate lower than the lowest data rate in 802.11b/g. A transmitting station (which may be an access point or a user terminal) includes first and second processors. The first processor performs differential modulation and spectral spreading for a first set of at least one data rate (e.g., 1 and 2 Mbps) supported by 802.11b/g. The second processor performs forward error correction (FEC) encoding, symbol mapping, and spectral spreading for a second set of at least one data rate (e.g., 250, 500, and 1000 Kbps) supported by the range extension mode. The transmitting station can send a transmission at a data rate supported by either 802.11b/g or the range extension mode, e.g., depending on the desired coverage range for the transmission. A receiving station performs the complementary processing to recover the transmission.

41 Claims, 6 Drawing Sheets

U.S. PATENT DOCUMENTS

| | | | |
|---|---|---|---|
| 6,970,681 B2 * | 11/2005 | Darabi et al. | 455/73 |
| 7,079,847 B2 * | 7/2006 | Blair et al. | 455/452.2 |
| 7,180,963 B2 * | 2/2007 | Wang et al. | 375/324 |
| 2002/0045441 A1 * | 4/2002 | Ralston et al. | 455/418 |
| 2002/0136276 A1 * | 9/2002 | Franceschini et al. | 375/148 |
| 2002/0146077 A1 * | 10/2002 | Mower et al. | 375/259 |
| 2003/0126545 A1 * | 7/2003 | Tan | 714/786 |
| 2003/0224724 A1 * | 12/2003 | Kato | 455/12.1 |
| 2004/0037237 A1 * | 2/2004 | Lalwaney | 370/320 |
| 2004/0077352 A1 * | 4/2004 | Mahany | 455/448 |
| 2004/0146091 A1 * | 7/2004 | Chang et al. | 375/147 |
| 2004/0240590 A1 | 12/2004 | Cameron et al. | |
| 2005/0030887 A1 * | 2/2005 | Jacobsen et al. | 370/208 |
| 2005/0100045 A1 * | 5/2005 | Hunkeler et al. | 370/465 |
| 2005/0143125 A1 * | 6/2005 | Maltsev et al. | 455/557 |
| 2005/0220218 A1 * | 10/2005 | Jensen et al. | 375/302 |
| 2005/0245298 A1 * | 11/2005 | Mori | 455/575.7 |
| 2005/0259720 A1 * | 11/2005 | McCorkle et al. | 375/130 |
| 2005/0270978 A1 * | 12/2005 | Haines | 370/235 |
| 2006/0035609 A1 * | 2/2006 | Darabi et al. | 455/140 |
| 2006/0036609 A1 * | 2/2006 | Suda et al. | 707/10 |
| 2008/0049654 A1 * | 2/2008 | Otal et al. | 370/311 |

FOREIGN PATENT DOCUMENTS

| | | |
|---|---|---|
| GB | 2171576 A | 8/1986 |
| JP | 2001217853 | 8/2001 |
| JP | 2002345048 | 11/2002 |
| JP | 2003199160 | 7/2003 |
| JP | 2003224620 | 8/2003 |
| JP | 2003524321 | 8/2003 |
| JP | 2005515704 | 5/2005 |
| JP | 2005515708 | 5/2005 |
| JP | 2005520387 | 7/2005 |
| JP | 2007509590 | 4/2007 |
| RU | 2014738 | 6/1994 |
| RU | 2169437 | 6/2001 |
| WO | WO03077434 | 9/2003 |
| WO | WO2005041612 | 5/2005 |

OTHER PUBLICATIONS

International Preliminary Report on Patentability—PCT/US2006/023585, International Search Authority—The International Bureau of WIPO—Geneva, Switzerland—Dec. 17, 2007.

Written Opinion—PCT/US2006/023585, International Search Authority—ISA/US-Feb. 22, 2007.

International Search Report—PCT/US2006/023585, International Search Authority—European Patent Office—Feb. 22, 2007.

Taiwanese Search report—TW095121432—TIPO—Apr. 21, 2009.

* cited by examiner

WIRELESS COMMUNICATION NETWORK WITH EXTENDED COVERAGE RANGE

CLAIM OF PRIORITY UNDER 35 U.S.C. §119

The present Application for patent claims priority to Provisional Application No. 60/691,871 entitled "WIRELESS COMMUNICATION NETWORK WITH EXTENDED COVERAGE RANGE" filed Jun. 16, 2005, and assigned to the assignee hereof and hereby expressly incorporated by reference herein.

BACKGROUND

I. Field

The present disclosure relates generally to communication, and more specifically to a wireless communication network with extended coverage range.

II. Background

Wireless communication networks are widely deployed to provide various communication services such as data, voice, video, and so on. These networks include wireless wide area networks (WWANs) that provide communication coverage for large geographic areas (e.g., cities), wireless local area networks (WLANs) that provide communication coverage for medium-size geographic areas (e.g., buildings and campuses), and wireless personal area networks (WPANs) that provide communication coverage for small geographic areas (e.g., homes). A wireless network typically includes one or more access points (or base stations) that support communication for one or more user terminals (or wireless devices).

IEEE 802.11 is a family of standards developed by The Institute of Electrical and Electronics Engineers (IEEE) for WLANs. These standards specify an over-the-air interface between an access point and a user terminal or between two user terminals. IEEE Std 802.11, 1999 Edition (or simply, "802.11"), which is entitled "Part 11: Wireless LAN Medium Access Control (MAC) and Physical Layer (PHY) Specifications," supports data rates of 1 and 2 mega bits/second (Mbps) in the 2.4 giga Hertz (GHz) frequency band using either frequency hopping spread spectrum (FHSS) or direct sequence spread spectrum (DSSS). IEEE Std 802.11a-1999 (or simply, "802.11a") is a supplement to 802.11, uses orthogonal frequency division multiplexing (OFDM) instead of FHSS or DSSS, and supports data rates of up to 54 Mbps in the 5 GHz frequency band. IEEE Std 802.11b-1999 (or simply, "802.11b") is another supplement to 802.11 and uses DSSS to support data rates of up to 11 Mbps. IEEE Std 802.11g-2003 (or simply, "802.11g") is yet another supplement to 802.11, uses DSSS and OFDM, and supports data rates of up to 54 Mbps in the 2.4 GHz band. These various standards are well known in the art and publicly available.

The lowest data rate supported by 802.11, 802.11a, 802.11b and 802.11g is 1 Mbps. For 802.11b and 802.11g (or simply, "802.11b/g"), a specific DSSS scheme and a specific modulation scheme are used to send a transmission at the lowest data rate of 1 Mbps. The DSSS and modulation schemes for 1 Mbps require a certain minimum signal-to-noise-and-interference ratio (SNR) for reliable reception of the transmission. The range of the transmission is then determined by the geographic area within which a receiving station can achieve the required SNR or better. In certain instances, it is desirable to send a transmission with a range that is greater than the range for the lowest data rate supported by 802.11b/g.

There is therefore a need in the art for a wireless communication network with extended coverage range.

SUMMARY

A wireless communication network that supports 802.11b and/or 802.11g as well as a range extension mode is described herein. In an embodiment, the range extension mode supports at least one data rate that is lower than the lowest data rate supported by 802.11b/g. The lower data rate(s) may be used to extend coverage range, which is beneficial for certain applications such as walkie-talkie.

In an embodiment, a transmitting station (which may be an access point or a user terminal) includes first and second processors. The first processor performs differential modulation and spectral spreading for a first set of at least one data rate (e.g., 1 and 2 Mbps) supported by 802.11b/g. The second processor performs forward error correction (FEC) encoding, symbol mapping, and spectral spreading for a second set of at least one data rate (e.g., 250, 500, and 1000 Kbps) supported by the range extension mode. The transmitting station can send a transmission at a data rate supported by either 802.11b/g or the range extension mode, e.g., depending on the desired coverage range for the transmission.

In an embodiment, a receiving station (which may also be an access point or a user terminal) includes first and second processors. The first processor performs spectral despreading and differential demodulation for the first set of at least one data rate supported by 802.11b/g. The second processor performs spectral despreading, coherent or differential demodulation, and FEC decoding for the second set of at least one data rate supported by the range extension mode.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
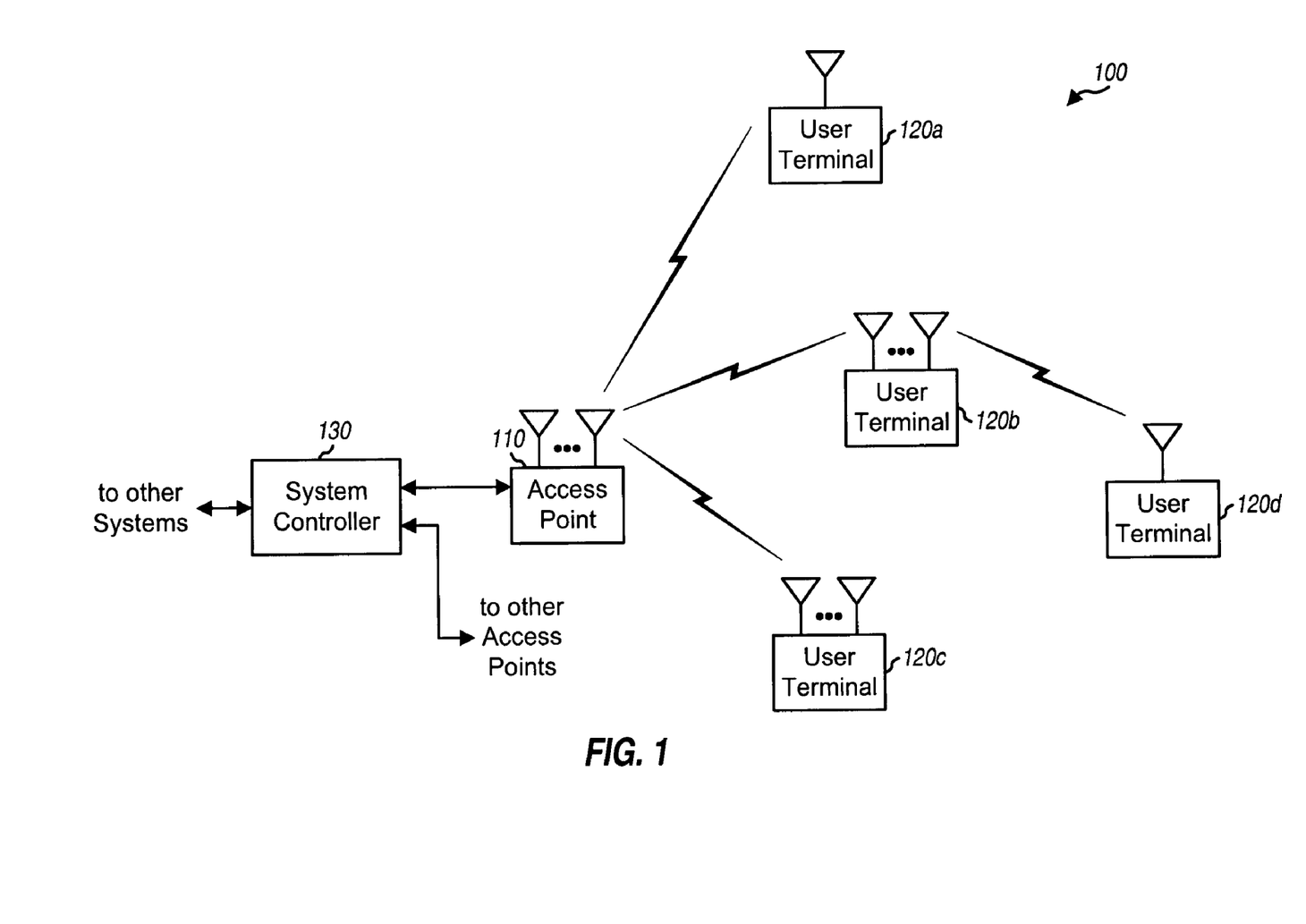
FIG. 1 shows a wireless network with an access point and user terminals.

FIG. 1 shows a wireless network 100 with an access point 110 and user terminals 120. An access point is generally a fixed station that communicates with the user terminals and may also be called a base station, a base transceiver subsystem (BTS), or some other terminology. A user terminal may be fixed or mobile and may also be called a mobile station, a wireless device, a user equipment (UE), or some other terminology. A user terminal may communicate with an access point, in which case the roles of access point and user terminal are established. A user terminal may also communicate peer-to-peer with another user terminal. For a centralized network architecture, a system controller 130 couples to the access points and provides coordination and control for these access points.

An access point may be equipped with a single antenna or multiple antennas for data transmission and reception. A user terminal may also be equipped with a single antenna or multiple antennas for data transmission and reception. In FIG. 1, access point 110 is equipped with multiple (e.g., two or four) antennas, user terminals 120a and 120d are each equipped with a single antenna, and user terminals 120b and 120c are each equipped with multiple antennas.

Figure 2:
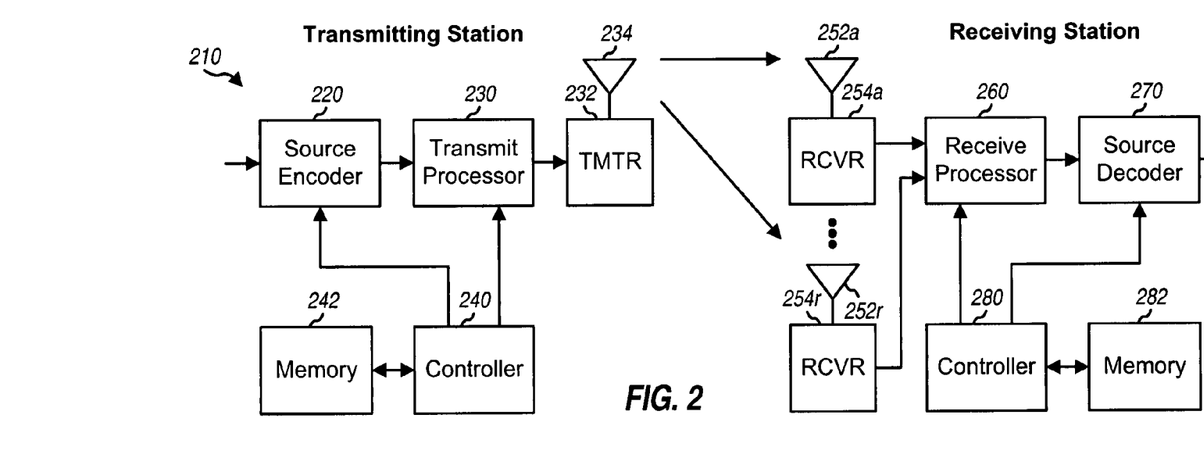
FIG. 2 shows a block diagram of a transmitting station and a receiving station.

FIG. 2 shows a block diagram of a transmitting station 210 and a receiving station 250 in wireless network 100. Transmitting station 210 is equipped with a single antenna and may be an access point or a user terminal. Receiving station 250 is equipped with multiple (e.g., R=2) antennas and may also be an access point or a user terminal.

At transmitting station 210, a source encoder 220 encodes raw data (e.g., voice or video data) based on a source encoding scheme and generates traffic data. The source encoding scheme is dependent on the end application and may be, e.g., an Enhanced Variable Rate Codec (EVRC) encoder for voice, an H.324 encoder for video, and so on. A transmit processor 230 receives the traffic data from source encoder 220, processes the traffic data in accordance with a data rate selected for transmission, and provides output chips. The processing by transmit processor 230 is described below. A transmitter unit (TMTR) 232 processes (e.g., converts to analog, amplifies, filters, and frequency upconverts) the output chips and generates a modulated signal, which is transmitted via an antenna 234.

At receiving station 250, R antennas 252a through 252r receive the transmitted signal, and each antenna 252 provides a received signal to a respective receiver unit (RCVR) 254. Each receiver unit 254 processes its received signal and provides a stream of input samples to a receive processor 260. Receive processor 260 processes the input samples from all R receiver units 254a through 254r in a manner complementary to the processing performed by transmit processor 230 and provides output data, which is an estimate of the traffic data sent by transmitting station 210. A source decoder 270 processes the output data in a manner complementary to the processing performed by source encoder 220 and provides decoded data.

Controllers 240 and 280 direct the operation of the processing units at transmitting station 210 and receiving station 250, respectively. Memory units 242 and 282 store data and/or program codes used by controllers 240 and 280, respectively.

Stations 210 and 250 may support 802.11b or 802.11g. 802.11g is backward compatible with 802.11b and supports all of the operating modes defined by 802.11b. Table 1 lists the two lowest data rates supported by 802.11b and 802.11g and the processing for each data rate. Differential binary phase shift keying (DBPSK) is used for 1 Mbps, and differential quadrature phase shift keying (DQPSK) is used for 2 Mbps.

TABLE 1

| Data Rate | FEC Encoding | Spectral Spreading | Modulation |
|---|---|---|---|
| 1 Mbps | None | DSSS | DBPSK |
| 2 Mbps | None | DSSS | DQPSK |

For clarity, in the following description, the term "bit" refers to a quantity prior to modulation (or symbol mapping) at the transmitting station, the term "symbol" refers to a quantity after the symbol mapping, and the term "chip" refers to a quantity after spectral spreading.

Figure 3:
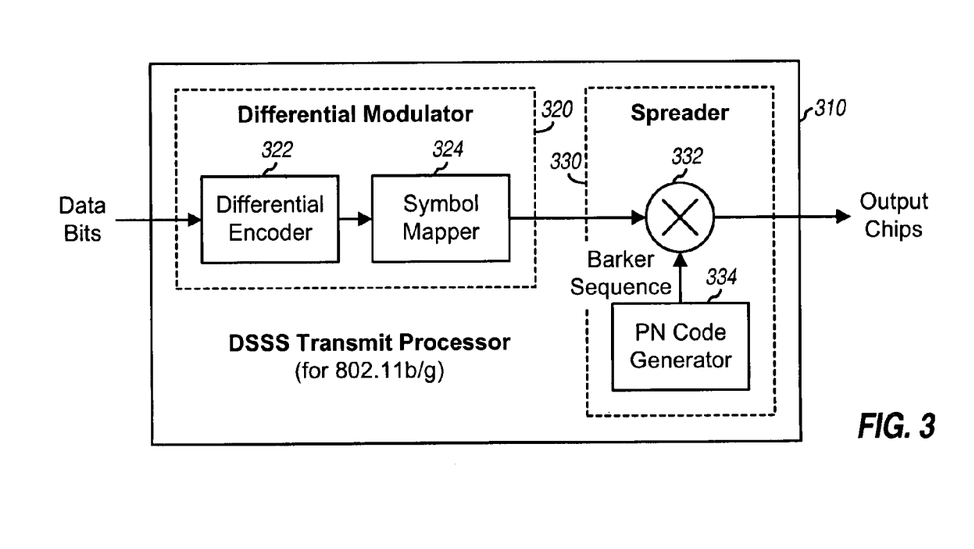
FIG. 3 shows a DSSS transmit processor for 802.11b/g.

FIG. 3 shows a DSSS transmit processor 310 for the two lowest data rates in 802.11b/g. DSSS transmit processor 310 may be used for transmit processor 230 at transmitting station 210 in FIG. 2. DSSS transmit processor 310 includes a differential modulator 320 that maps data bits to modulation symbols and a spreader 330 that spectrally spreads the modulation symbols and provides output chips.

Within differential modulator 320, a differential encoder 322 receives the data bits for traffic data, performs differential encoding on the data bits for DBPSK or DQPSK, and provides differentially-encoded bits. For DBPSK, a data bit of '0' results in a phase change of 0°, and a data bit of '1' results in a phase change of 180° or $\pi$. For DQPSK, a data bit pair of '00' results in a phase change of 0°, a data bit pair of '01' results in a phase change of +90° or $\pi/2$, a data bit pair of '11' results in a phase change of +180° or $\pi$, and a data bit pair of '10' results in a phase change of +270° or $3\pi/2$. A symbol mapper 324 maps the differentially-encoded bits to modulation symbols based on BPSK for the 1 Mbps data rate and QPSK for the 2 Mbps data rate. The symbol mapping may be achieved by (1) grouping sets of B bits to form B-bit binary values, where B=1 for BPSK and B=2 for QPSK, and (2) mapping each B-bit binary value to a point in a signal constellation for the selected modulation scheme. Each mapped signal point is a complex value and corresponds to a modulation symbol. Symbol mapper 324 provides BPSK modulation symbols at a rate of 1 mega symbols/second (Msps) for the 1 Mbps data rate and provides QPSK modulation symbols at a rate of 1 Msps for the 2 Mbps data rate.

Within spreader 330, a pseudo-random number (PN) code generator 334 generates a PN code sequence, which is also called a Barker sequence. The Barker sequence is 11 chips long, has a rate of 11 mega chips/second (Mcps), and is composed of the following 11-chip sequence {+1, −1, +1, +1, −1, +1, +1, +1, −1, −1, −1}. A multiplier 332 receives modulation symbols at a rate of 1 Msps from symbol mapper 324 and the Barker sequence from PN code generator 334, multiplies each modulation symbol with all 11 chips of the Barker sequence to generate 11 output chips for that modulation symbol, and provides a sequence of output chips. The output chip rate is 11 times the modulation symbol rate, or 11 Mcps. Each output chip is a complex value to be sent in one chip period, which is approximately 90.9 nanoseconds (ns).

As shown in FIG. 3, the data bits are not FEC encoded but are spectrally spread with the Barker sequence. The spectral spreading provides a processing gain of approximately 10.4 decibels (dB).

Wireless network 100 may be designed to support an operating mode with an extended range. This range extension mode provides additional link margin (e.g., 10 dB more link margin than the 1 Mbps data rate in 802.11b/g) and may be used for various applications. For example, the range extension mode may allow a user terminal to communicate peer-to-peer with another user terminal over a longer range and may be designed to be competitive with current 450 MHz walkie-talkie (WT) technology. The range extension mode may be designed to utilize as much of the existing 802.11b/g hardware, firmware, and software as possible, so that the incremental cost of supporting the range extension mode is as small as possible. In addition, the range extension mode may utilize functionalities commonly used in other wireless networks, such as an EVRC voice coder/decoder (codec) used to encode and decode voice signal.

Figure 4:
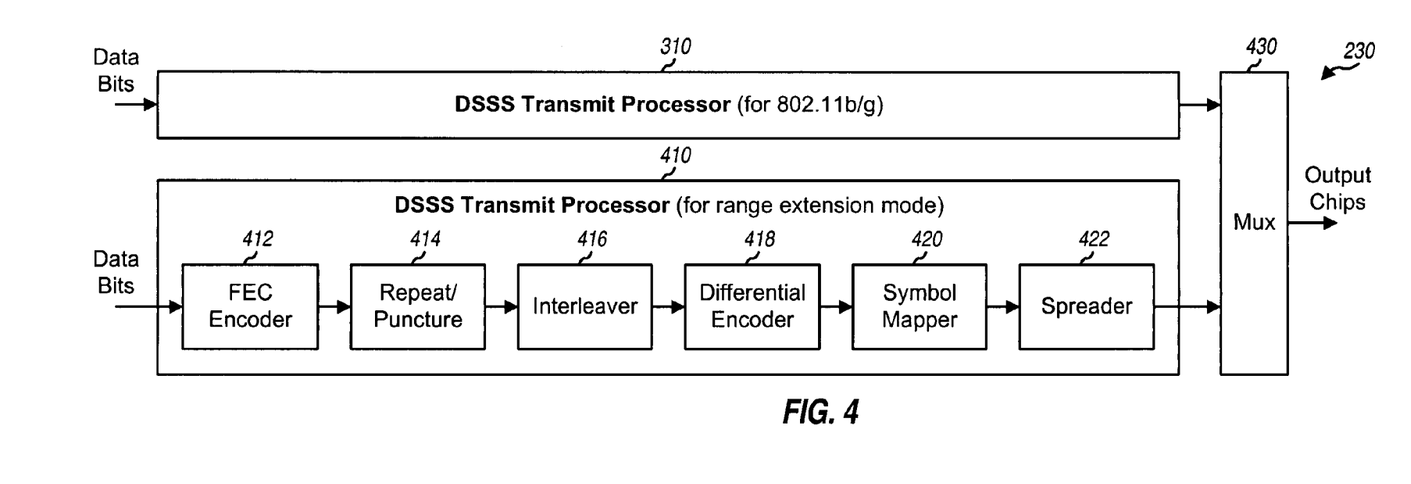
FIG. 4 shows a transmit processor at the transmitting station.

FIG. 4 shows an embodiment of transmit processor 230 at transmitting station 210 in FIG. 2. Transmit processor 230 supports the 1 and 2 Mbps data rates for 802.11b/g as well as new data rates for the range extension mode. Transmit processor 230 includes (1) DSSS transmit processor 310 that performs differential modulation and spectral spreading for 802.11b/g, (2) a DSSS transmit processor 410 that performs FEC encoding, symbol mapping, and spectral spreading for the range extension mode, and (3) a multiplexer (Mux) 430. DSSS transmit processor 310 is implemented as shown in FIG. 3.

Within DSSS transmit processor 410, an FEC encoder 412 receives the data bits for traffic data from source encoder 220, encodes the data bits in accordance with an FEC coding scheme, and provides code bits. FEC encoder 412 may implement a convolutional code, a Turbo code, a low-density parity check (LDPC) code, a block code, some other code, or a combination thereof. As an example, FEC encoder 412 may be a rate ½, constraint length K=7 binary convolutional encoder that generates two code bits for each data bit. The FEC encoding increases the reliability of a transmission and is also called channel encoding. A repeat/puncture unit 414 may either repeat or puncture (i.e., delete) some or all of the code bits to obtain the desired code rate. For example, if FEC encoder 412 is a rate ½ convolutional encoder, then a code rate of ¼ may be obtained by repeating each code bit once, and a code rate greater than ½ may be obtained by deleting some of the code bits. An interleaver 416 interleaves or reorders the code bits from repeat/puncture unit 414 based on an interleaving scheme. The interleaving provides time, frequency, and/or spatial diversity for the code bits. The interleaving may be selectively performed for certain transmissions, e.g., for certain data rates and/or certain PPDU sizes. The interleaving may also be omitted.

In an embodiment, differential modulation is used for the range extension mode. For this embodiment, a differential encoder 418 performs differential encoding on the interleaved bits, e.g., for DBPSK or DQPSK, and provides differentially-encoded bits. A symbol mapper 420 maps the differentially-encoded bits to modulation symbols based on a modulation scheme, e.g., BPSK or QPSK. Differential encoder 418 and symbol mapper 420 may implement the same DBPSK or DQPSK schemes used in 802.11b/g and described above. A spreader 422 spectrally spreads the modulation symbols from symbol mapper 420. Spreader 422 may be implemented in the same manner as spreader 330 in FIG. 3 and may spread each modulation symbol with the 11-chip Barker sequence to generate 11 output chips for the modulation symbol. In another embodiment that is not shown in FIG. 4, regular modulation is used for the range extension mode. For this embodiment, differential encoder 418 is omitted, and symbol mapper 420 maps the interleaved bits to modulation symbols. The differential encoding for differential modulation may improve performance of a receiving station since a slip in a phase recovery circuit may result in loss of a few bits instead of an entire packet.

Multiplexer 430 receives the output chips from DSSS transmit processors 310 and 410 and a control indicating whether a data rate for 802.11b/g or the range extension mode is selected. Multiplexer 430 provides the output chips from DSSS transmit processor 310 if a data rate for 802.11b/g is selected and provides the output chips from DSSS transmit processor 410 if a data rate for the range extension mode is selected.

The range extension mode may support various data rates. Table 2 lists three exemplary data rates supported by the range extension mode and the coding and modulation for each data rate. The efficiency for each data rate is given in units of data bits/modulation symbol (bit/sym).

TABLE 2

| Data rate | Code Rate | Modulation | Spreading | Efficiency |
|---|---|---|---|---|
| 1 Mbps | ½ | QPSK | DSSS | 1 bit/sym |
| 500 Kbps | ½ | BPSK | DSSS | 0.5 bit/sym |
| 250 Kbps | ¼ | BPSK | DSSS | 0.25 bit/sym |

Table 2 shows an exemplary design for the range extension mode. Other data rates, code rates, and modulation schemes may also be supported by the range extension mode, and this is within the scope of the invention.

Figure 5:
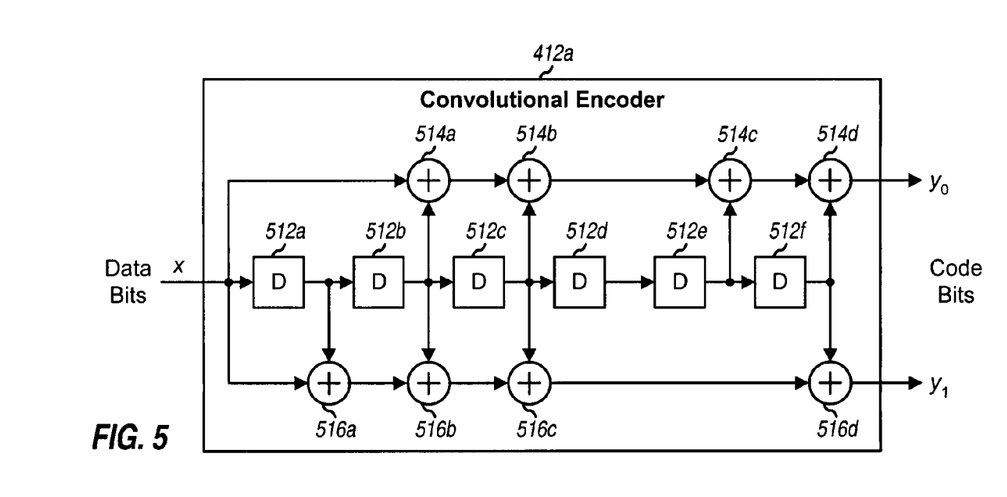
FIG. 5 shows a conventional encoder.

FIG. 5 shows a convolutional encoder 412a, which is an embodiment of FEC encoder 412 within DSSS transmit processor 410 in FIG. 4. For this embodiment, encoder 412a is a rate ½ binary convolutional encoder that provides two code bits $y_0$ and $y_1$ for each data bit x. Convolutional encoder 412a implements the following generator matrix:

$$G(D)=[g_0(D), g_1(D)],$$

where $g_0(D)=D^6+D^5+D^3+D^2+1$ and $g_1(D)=D^6+D^3+D^2+D+1$. Other generator matrices may also be used.

Convolutional encoder 412a includes six series-coupled delay elements 512a through 512f, four modulo-2 adders 514a through 514d for generator polynomial $g_0(D)$, and four modulo-2 adders 516a through 516d for generator polynomial $g_1(D)$. Initially, delay elements 512a through 512f are set to zeros. The data bits are provided to the first delay element 512a. For each data bit, adder 514a sums the input data bit with the bit from delay unit 512b, adder 514b sums the bit from adder 514a with the bit from delay unit 512c, adder 514c sums the bit from adder 514b with the bit from delay unit 512e, and adder 514d sums the bit from adder 514c with the bit from delay unit 512f and provides the first code bit $y_0$. For each data bit, adder 516a sums the input data bit with the bit from delay unit 512a, adder 516b sums the bit from adder 516a with the bit from delay unit 512b, adder 516c sums the bit from adder 516b with the bit from delay unit 516c, and adder 516d sums the bit from adder 516c with the bit from delay unit 512f and provides the second code bit $y_1$. Adders 514a through 514d and adders 516a through 516d perform modulo-2 sum operations.

For IEEE 802.11, data is processed by a medium access control (MAC) layer as MAC protocol data units (MPDUs). Each MPDU is processed by a physical layer convergence protocol (PLCP) and encapsulated in a PLCP protocol data unit (PPDU). Each PPDU is processed by a physical layer and transmitted via a wireless channel.

Figure 6:
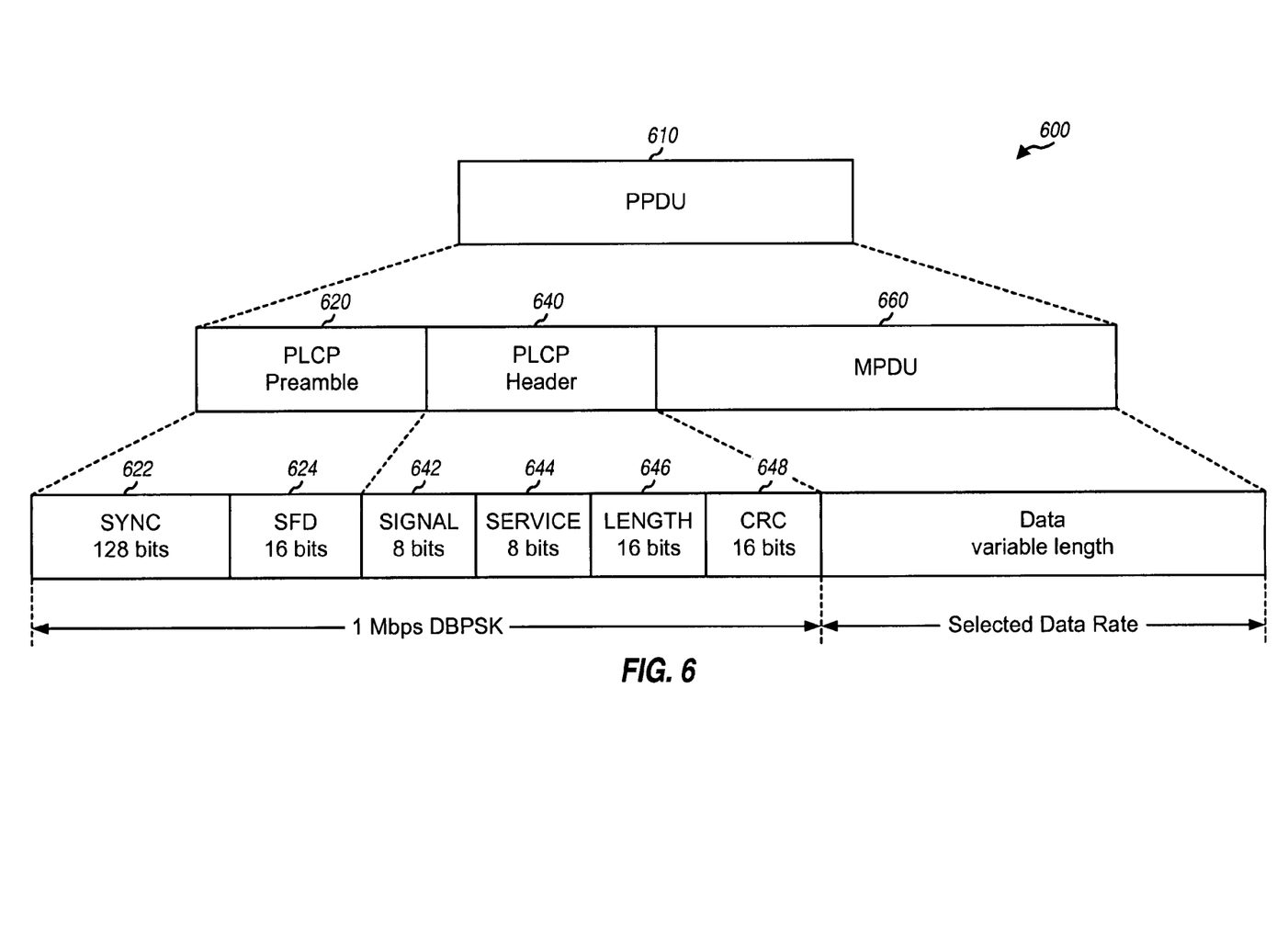
FIG. 6 shows a PPDU structure for 802.11b/g.

FIG. 6 shows a PPDU structure 600 defined by 802.11b/g. For PPDU structure 600, a PPDU 610 includes a PLCP preamble 620, a PLCP header 640, and an MPDU 660. MPDU 660 carries the data for PPDU 610 and is variable in length. PLCP preamble 620 includes a PLCP synchronization (SYNC) field 622 and a start frame delimiter (SFD) field 624. SYNC field 622 carries a fixed 128-bit sequence that may be used by a receiving station for signal detection and synchronization. SFD field 624 carries a fixed 16-bit sequence that indicates the start of the PLCP header.

PLCP header 640 includes a SIGNAL field 642, a SERVICE field 644, a LENGTH field 646, and a cyclic redundancy check (CRC) field 648. SIGNAL field 642 indicates the data rate for the MPDU and is given in units of 100 Kbps. For example, SIGNAL field values of 10 and 20 (decimal) indicate data rates of 1 and 2 Mbps, respectively. SERVICE field 644 is reserved for future use, but a SERVICE field value of 0 signifies compliance with IEEE 802.11. LENGTH field 646 indicates the amount of time (in units of microseconds) required to send MPDU 660. CRC field 648 carries a CRC value that is generated based on the SIGNAL, SERVICE, and LENGTH fields. The CRC value may be used by a receiving station to determine whether PLCP header 640 is received correctly or in error.

As shown in FIG. 6, PLCP preamble 620 and PLCP header 640 are sent at 1 Mbps using DBPSK. The overhead for PLCP preamble 620 is 144 bits, the overhead for PLCP header 640 is 48, and the total overhead for PPDU 610 is 192 bits. The 192 bits are processed to generate 192 BPSK modulation symbols, which are transmitted in 192 symbol periods. Each symbol period has a duration of 1 microsecond (μs). MPDU 660 is sent at the data rate indicated by SIGNAL field 642.

Figure 7:
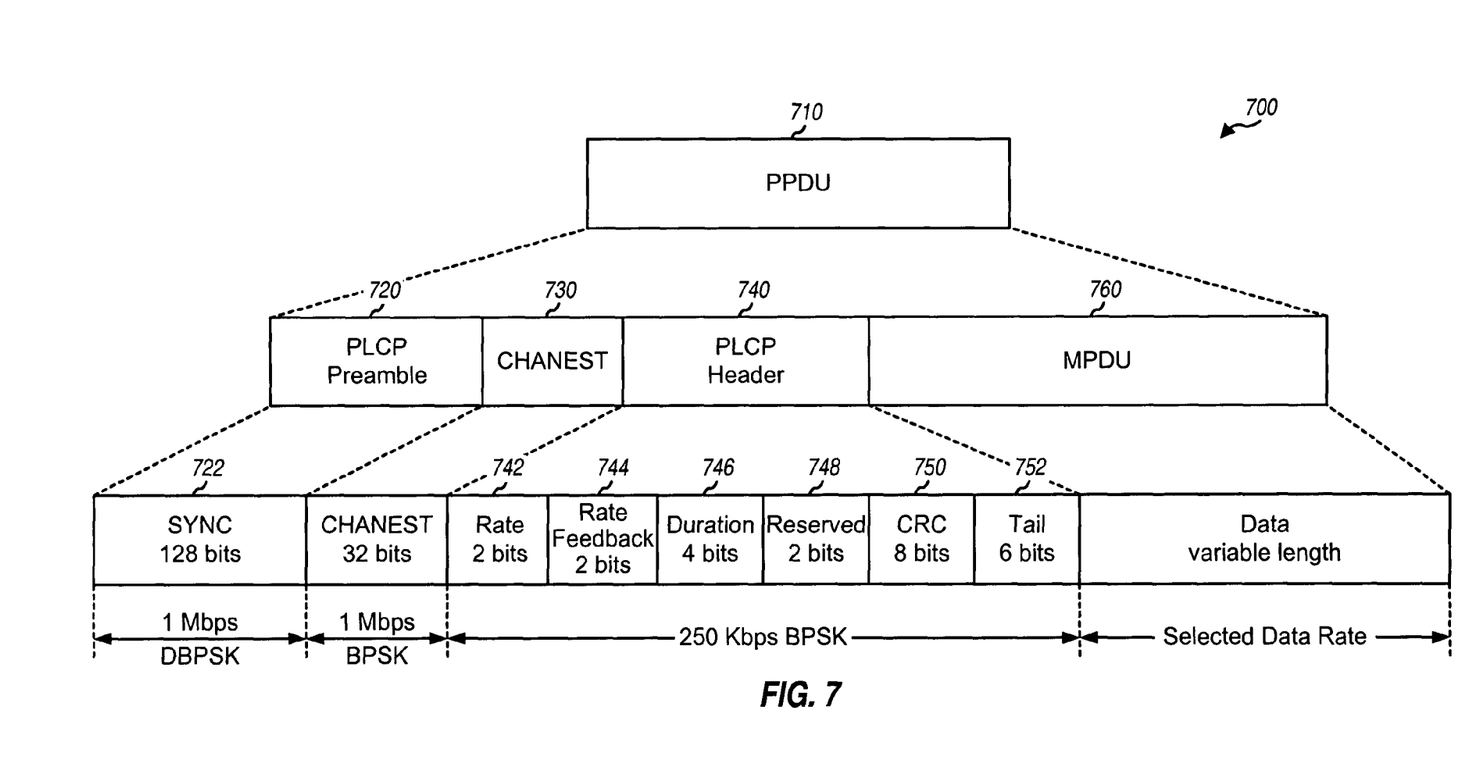
FIG. 7 shows a PPDU structure for the range extension mode.

FIG. 7 shows an exemplary PPDU structure 700 that may be used for the range extension mode. For PPDU structure 700, a PPDU 710 includes a PLCP preamble 720, a channel estimation (CHANEST) field 730, a PLCP header 740, and an MPDU 760. MPDU 760 carries the data for PPDU 710 and is variable in length. PLCP preamble 720 includes a SYNC field 722 that carries the fixed 128-bit sequence. CHANEST field 730 carries a fixed bit sequence that may be used for channel estimation by a receiving station. The fixed bit sequence for CHANEST field 730 may be a PN sequence that is generated in similar manner as the fixed 128-bit sequence for the PLCP preamble. CHANEST field 730 may have a fixed length (e.g., 32 bits for the embodiment shown in FIG. 7) or may have a configurable length (e.g., from 0 to 64 bits). The length of CHANEST field 730 may be selected to provide a receiving station with sufficient time to perform frequency acquisition, channel estimation, and so on prior to receiving the MPDU.

In an embodiment, PLCP header 740 includes a Rate field 742, a Rate Feedback field 744, a Duration field 746, a Reserved field 748, a CRC field 750, and a Tail field 752. Rate field 742 indicates the data rate used for the data transmission in the forward direction. Rate Feedback field 744 indicates the data rate to use for feedback sent in the reverse direction. Duration field 746 indicates the duration of MPDU 760. Reserved field 748 is reserved for future use. CRC field 750 carries a CRC value that is generated based on the Rate, Rate Feedback, Duration, and Reserved fields. Tail field 752 carries K−1 tail bits (with values of '0'), which are used to reset the constraint length K convolutional encoder to a known state at the end of PLCP header 740.

Table 3 shows an exemplary embodiment of the fields in PLCP header 740. For this embodiment, the Rate and Rate Feedback fields are defined as shown Table 3. The Duration field is given in units of 250 microseconds (μs), e.g., '0000' denotes 250 μs and '1111' denotes 4 ms. Other units, in time or number of bits, may also be used for the Duration field.

TABLE 3

| Field | Number of bits | Description |
| --- | --- | --- |
| Rate | 2 | '00' = 250 Kbps; '01' = 500 Kbps; '10' = 1 Mbps; '11' = reserved |
| Rate Feedback | 2 | '00' = 250 Kbps; '01' = 500 Kbps; '10' = 1 Mbps; '11' = 802.11n at 6 Mbps |
| Duration | 4 | 16 fixed durations in units of 250 microseconds |
| Reserved | 2 | Reserved for future use |
| CRC | 8 | CRC value generated based on the Rate, Rate Feedback, Duration, and Reserved fields |
| Tail | 6 | Zero bits |

IEEE 802.11n is a supplement to 802.11, supports higher data rates, and is being proposed.

For the embodiment shown in FIG. 7, PLCP preamble 720 is sent at 1 Mbps using DBPSK, CHANEST field 730 is sent at 1 Mbps using BPSK, and PLCP header 740 is sent at 250 Kbps using BPSK. The 24 bits for PLCP header 740 are encoded at rate ¼ to generate 96 code bits. These 96 code bits are mapped to 96 BPSK modulation symbols, which are transmitted in 96 symbol periods. MPDU 760 is sent at the data rate indicated by Rate field 742.

FIG. 7 and Table 3 show a specific embodiment of PLCP header 740 for the range extension mode. In general, PPDU 710 may include any number of fields for any type of signaling and data, each field may include any number of bits, and the values for each field may be defined in various manners. For example, PLCP preamble 720 may also include a 16-bit SFD field and may then be the same as PLCP preamble 620 in FIG. 6. As another example, CRC field 750 may be reduced to 4 bits, and Reserved field 748 may be increased to 6 bits in order to maintain the same total number of bits for PLCP header 740.

In the following description, PPDU 610 in FIG. 6 is referred to as a legacy PPDU, and PLCP header 640 is referred to as a legacy PLCP header. PPDU 710 in FIG. 7 is referred to as a new PPDU, and PLCP header 740 is referred to as a new PLCP header. A new station is a station that supports both 802.11b/g and the range extension mode. A legacy station is a station that supports 802.11b/g but not the range extension mode. A station may be an access point or a user terminal.

The new PPDU supports the range extension mode for new stations without adversely affecting the operation of legacy stations. The new PPDU uses the same SYNC field that can be detected by both new and legacy stations. A legacy station would detect the SYNC field in the new PPDU but would not detect the SFD field and would also fail the CRC check. The legacy station would then revert to sensing the wireless channel due to SFD and CRC failures. Hence, there is no need to set a network allocation vector (NAV) for the legacy station to indicate that this station should not transmit on the wireless channel.

A new station would detect the SYNC field in the new PPDU and would not detect the SFD field. The absence of the SFD field may be used to distinguish between the legacy PPDU for 802.11b/g and the new PPDU for the range extension mode. Upon detecting the new PPDU, the new station would process the remaining portion of the new PPDU in accordance with PPDU structure 700 in FIG. 7. The processing by the new station for the new PPDU is described below.

The range extension mode may be used for various applications such as voice, video, data, and so on. For voice, an EVRC encoder may be used as source encoder 220 in FIG. 2 to encode voice data and generate EVRC packets at periodic intervals, e.g., one EVRC packet every 20 milliseconds (ms). The EVRC encoder can provide EVRC packets at one of several supported codec rates.

Table 4 shows the new PPDU sizes for EVRC packets at four different codec rates of 1, 2, 4, and 8 Kbps with the CHANEST field omitted. In this case, the overhead for the new PPDU includes 224 total symbols, or 128 symbols for the SYNC field plus 96 symbols for the new PLCP header. The EVRC packets contain 24, 48, 96, and 192 data bits for 1, 2, 4, and 8 Kbps, respectively. The 24, 48, 96, and 192 data bits are FEC encoded and mapped to the number of symbols shown in Table 4. The PPDU duration is equal to the number of symbols for the overhead plus the number of symbols for the payload. Since each symbol is sent in 1 µs, Table 4 shows the PPDU durations for the four codec rates in units of both time (µs) and total number of symbols.

TABLE 4

PPDU Sizes (CHANEST = 0 bits)

| | | | Num of symbols/packet | | | PPDU Duration (µs) | | |
|---|---|---|---|---|---|---|---|---|
| Codec Rate | Overhead | Packet Payload | 250 Kbps | 500 Kbps | 1 Mbps | 250 Kbps | 500 Kbps | 1 Mbps |
| 1 Kbps | 224 | 24 | 96 | 48 | 24 | 320 | 272 | 248 |
| 2 Kbps | 224 | 48 | 192 | 96 | 48 | 416 | 320 | 272 |
| 4 Kbps | 224 | 96 | 384 | 192 | 96 | 608 | 416 | 320 |
| 8 Kbps | 224 | 192 | 768 | 384 | 192 | 992 | 608 | 416 |

Table 5 shows the new PPDU sizes for EVRC packets at four different codec rates of 1, 2, 4, and 8 Kbps with the CHANEST field containing 64 bits. In this case, the overhead for the new PPDU includes 288 total symbols, or 128 symbols for the SYNC field plus 64 symbols for the CHANEST field plus 96 symbols for the new PLCP header. The number of symbols per EVRC packet is the same as in Table 4. The PPDU durations for the four codec rates are increased by 64 µs due to the CHANEST field.

TABLE 5

PPDU Sizes (CHANEST = 64 bits)

| | | | Num of symbols/packet | | | PPDU Duration (µs) | | |
|---|---|---|---|---|---|---|---|---|
| Codec Rate | Overhead | Payload | 250 Kbps | 500 Kbps | 1 Mbps | 250 Kbps | 500 Kbps | 1 Mbps |
| 1 Kbps | 288 | 24 | 96 | 48 | 24 | 384 | 336 | 312 |
| 2 Kbps | 288 | 48 | 192 | 96 | 48 | 480 | 384 | 336 |
| 4 Kbps | 288 | 96 | 384 | 192 | 96 | 672 | 480 | 384 |
| 8 Kbps | 288 | 192 | 768 | 384 | 192 | 1056 | 672 | 480 |

Figure 8:
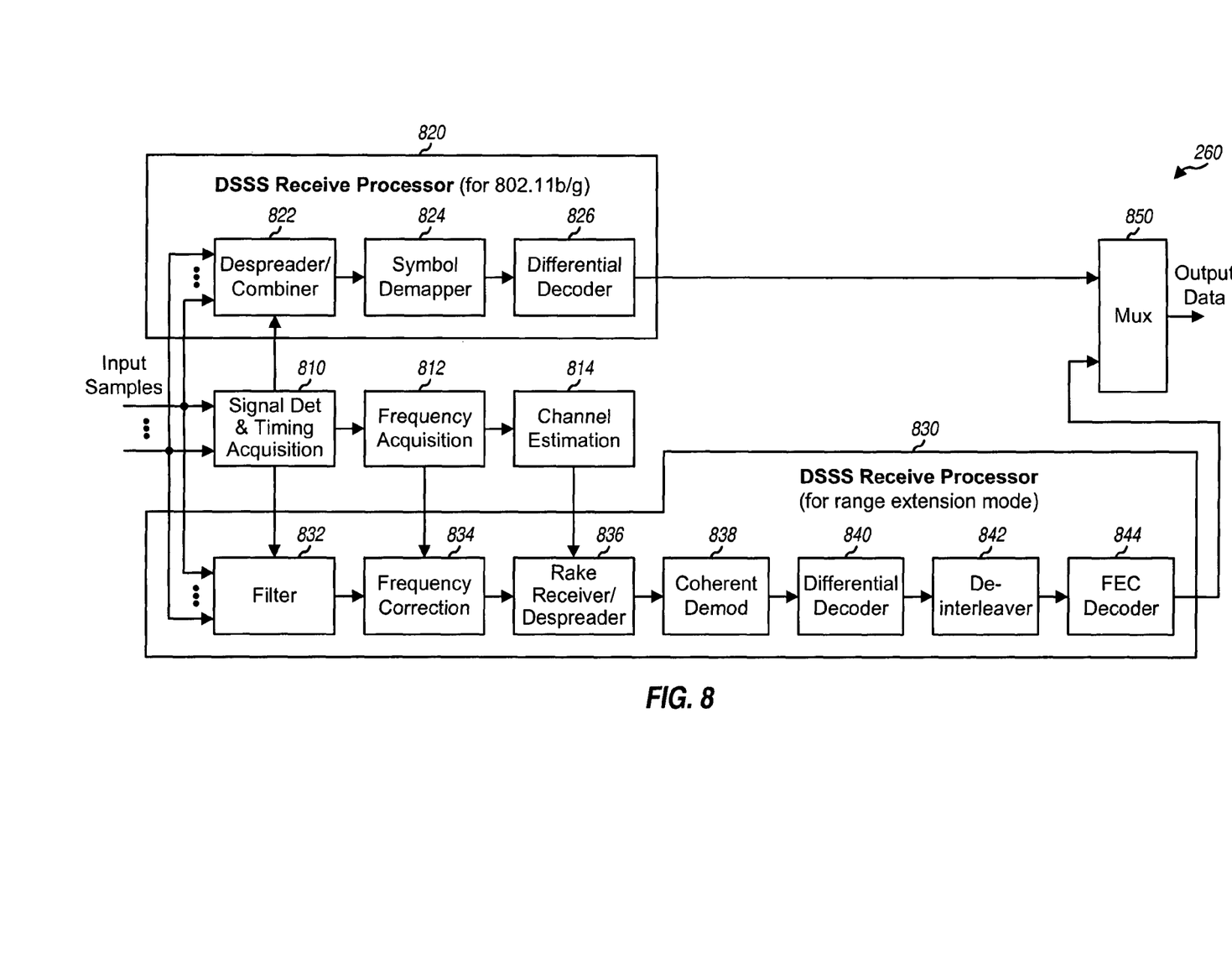
FIG. 8 shows a receive processor at the receiving station.

FIG. 8 shows an embodiment of receive processor 260 at receiving station 250 in FIG. 2. Receive processor 260 includes (1) a DSSS receive processor 820 that performs spectral despreading and differential demodulation for 802.11b/g, (2) a DSSS receive processor 830 that performs spectral despreading, coherent demodulation, and FEC decoding for the range extension mode, and (3) other processing units. Receive processor 260 receives a stream of input samples (e.g., at the chip rate of 11 Mcps) from each receiver unit 254.

A signal detection (det) and timing acquisition unit 810 detects for the 128-bit sequence in the SYNC field of the PPDU preamble and further determines the timing of the detected 128-bit sequence. Unit 810 may despread the input samples with the Barker sequence in each chip period and generate despread symbols at the chip rate. Unit 810 may then correlate the despread symbols with the 128-bit sequence for different chip periods, compute the signal energy for each chip period, and declare signal detection if the signal energy exceeds a predetermined threshold. The timing of the signal peak may be used as the timing of the received signal.

A frequency acquisition unit 812 estimates the frequency error in the input samples. Unit 812 may multiply the despread symbols with the bits in the fixed 128-bit sequence used for the SYNC field, perform a fast Fourier transform (FFT) on the resultant symbols, compute the energy of each subband based on the outputs from the FFT, and estimate the frequency error as the subband with the largest energy.

A channel estimation unit 814 estimates the response of the wireless channel based on the input samples for the SYNC field and the CHANEST field (if sent). Unit 814 may derive a channel gain estimate for each chip index of the Barker sequence and obtain an 11-tap channel impulse response estimate for the wireless channel. Unit 814 may multiply the input sample for each chip period of each symbol period with the PN code value for that chip period and the SYNC bit value for that symbol period. Unit 814 may then accumulate the resultant samples for each of the 11 chip indices for the Barker sequence to obtain the channel gain estimate for that chip index. The energy of the channel gain estimates for all 11 chip indices may be computed and used for final signal detection.

DSSS receive processor 820 processes a received PPDU if unit 810 indicates that the received PPDU is a legacy PPDU. Within DSSS receive processor 820, a despreader/combiner 822 performs despreading of the input samples with the Barker sequence, combines the despread symbols for different receive antennas, and provides detected symbols. A symbol demapper 824 demaps the detected symbols based on the modulation scheme (e.g., BPSK or QPSK) used for transmission. A differential decoder 826 performs differential decoding on the output from symbol demapper 824 and provides output bits, which are estimates of the data bits sent by transmitting station 210. In general, the processing by DSSS receive processor 820 is complementary to the processing by DSSS transmit processor 310 at transmitting station 210. FIG. 8 shows an exemplary design of DSSS receive processor 820, which may include other processing units not shown in FIG. 8 for simplicity.

DSSS receive processor 830 processes a received PPDU if unit 810 indicates that the received PPDU is a new PPDU. Within DSSS receive processor 830, a filter 832 filters the input samples to remove out-of-band noise and interference. Filter 832 may also resample the input samples to compensate for timing drift across the received PPDU and/or for sample rate conversion from the sampling rate to the chip rate. A frequency correction unit 834 removes frequency offset in the samples from filter 832 by multiplying these samples with a phasor rotating at the offset frequency. A rake receiver/despreader 836 multiplies the samples from unit 834 with the channel gain estimates, performs despreading with the Barker sequence, accumulates the despread results for all R antennas, and provides detected symbols. The channel gain estimates may be derived once based on the SYNC field and possibly the CHANEST field of the received PPDU and may be used for the entire received PPDU. In this case, rake receiver 838 may not be tracking the wireless channel across the received PPDU. A coherent demodulator (Demod) 838 removes phase error in the detected symbols due to residual frequency error and provides demodulated symbols, which are estimates of the modulation symbols sent by transmitting station 210. Coherent demodulator 838 may determine a phase reference for each detected symbol, compare the phase of the detected symbol against this phase reference, and derive a demodulated symbol for the detected symbol based on the phase comparison. A differential decoder 840 performs differential decoding on the demodulated symbols from coherent demodulator 838 and provides output symbols. A deinterleaver 840 deinterleaves the output symbols in a manner complementary to the interleaving performed by interleaver 416 in FIG. 4. An FEC decoder 842 decodes the deinterleaved symbols in a manner complementary to the encoding performed by FEC encoder 412 in FIG. 4 and provides output data.

A multiplexer 850 receives the output data from DSSS receive processors 820 and 830, provides the output data from DSSS receive processor 820 if the received PPDU is a legacy PPDU, and provides the output data from DSSS receive processor 830 if the received PPDU is a new PPDU.

FIG. 8 shows a specific embodiment of receive processor 260 for 802.11b/g and the range extension mode. Receive processor 260 may also be implemented with other designs, and this is within the scope of the invention.

The data transmission and reception techniques described herein may be implemented by various means. For example, these techniques may be implemented in hardware, software, or a combination thereof. For a hardware implementation, the processing units used to process data for transmission at a transmitting station (e.g., DSSS transmit processors 310 and 410 in FIG. 4) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used for data reception at a receiving station (e.g., DSSS receive processors 820 and 830 in FIG. 8) may also be implemented within one or more ASICs, DSPs, processors, electronic devices, and so on. The processors at each station may share hardware units.

For a software implementation, the data transmission and reception techniques may be implemented with modules (e.g., procedures, functions, and so on) that perform the functions described herein. The software codes may be stored in a memory unit (e.g., memory unit 242 or 282 in FIG. 2) and executed by a processor (e.g., controller 240 or 280). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a first processor operative to perform differential modulation and spectral spreading for a first set of at least one data rate for IEEE 802.11b;
   a second processor operative to perform forward error correction (FEC) encoding, symbol mapping, and spectral spreading for a second set of at least one data rate, wherein the second processor is operative to process a protocol data unit comprising a preamble, a header, and a data field and wherein the header comprises a rate field indicating a data rate used for the data field and a rate feedback field indicating a data rate to use for feedback; and
   a multiplexor circuit, responsive to a control signal, to selectively provide output from the first processor if the first set of at least one data rate for IEEE 802.11b is selected or output from the second processor if the second set of at least one data rate is selected.

2. The apparatus of claim 1, wherein the second set includes a data rate that is lower than a lowest data rate in the first set.

3. The apparatus of claim 1, wherein the first processor is operative to perform differential modulation and spectral spreading in accordance with IEEE 802.11b for data rates of 1 and 2 mega bits/second (Mbps).

4. The apparatus of claim 1, wherein the second processor is operative to perform FEC encoding, symbol mapping, and spectral spreading for data rates of less than 1 mega bits/second (Mbps).

5. The apparatus of claim 1, wherein the second processor is operative to perform FEC encoding, symbol mapping, and spectral spreading for data rates of 250 and 500 kilo bits/second (Kbps).

6. The apparatus of claim 1, wherein the second processor is operative to perform FEC encoding on traffic data in accordance with a convolutional code, to map FEC encoded data to modulation symbols, and to spectrally spread the modulation symbols.

7. The apparatus of claim 6, wherein the second processor is further operative to interleave the FEC encoded data and to map interleaved data to modulation symbols.

8. The apparatus of claim 6, wherein the second processor is further operative to perform differential encoding prior to symbol mapping.

9. The apparatus of claim 1, wherein the second processor is operative to perform FEC encoding on traffic data in accordance with a rate 1/2 convolutional code and to repeat FEC encoded data for a code rate lower than rate 1/2.

10. The apparatus of claim 1, further comprising: a controller operative to select the first or second processor based on a range for a transmission.

11. The apparatus of claim 1, further comprising:
    an encoder operative to perform source encoding on voice data and to provide input data for the first and second processors.

12. The apparatus of claim 1, wherein the preamble comprises a SYNC field carrying a fixed sequence of bits.

13. The apparatus of claim 1, wherein the protocol data unit further comprises a channel estimation field carrying a fixed bit sequence used for channel estimation.

14. The apparatus of claim 1, wherein the header comprises a duration field indicating a duration of the data field.

15. A method of transmitting data in a wireless communication system, comprising:
    selecting a data rate for a transmission;
    performing differential modulation and spectral spreading for the transmission if the data rate is in a first set of at least one data rate for IEEE 802.11b to provide first modulated output;
    performing processing of a protocol data unit, forward error correction (FEC) encoding, symbol mapping, and spectral spreading for the transmission if the data rate is in a second set of at least one data rate to provide second modulated output, wherein the protocol data unit comprises a preamble, a header, and a data field and wherein the header comprises a rate field indicating a data rate used for the data field and a rate feedback field indicating a data rate to use for feedback; and generating a control signal indicative of the data rate to control a multiplexor circuit, to selectively provide the first modulated output if the data rate is in the first set of at least one data rate for IEEE 802.11b or to provide the second modulated output if the data rate is in the second set of at least one data rate.

16. The method of claim 15, wherein the performing FEC encoding, symbol mapping, and spectral spreading comprises performing FEC encoding, symbol mapping, and spectral spreading for the transmission if the data rate is less than 1 mega bits/second (Mbps).

17. The method of claim 15, wherein the performing FEC encoding, symbol mapping, and spectral spreading for the transmission comprises encoding data for the transmission in accordance with a convolutional code, mapping encoded data to modulation symbols, and spectrally spreading the modulation symbols.

18. The method of claim 15, wherein the selecting the data rate for the transmission comprises selecting the data rate for the transmission from the first set or the second set based on a range for the transmission.

19. An apparatus comprising:

means for selecting a data rate for a transmission;

means for performing differential modulation and spectral spreading for the transmission if the data rate is in a first set of at least one data rate for IEEE 802.11b to provide first modulated output;

means for performing processing of a protocol data unit, forward error correction (FEC) encoding, symbol mapping, and spectral spreading for the transmission if the data rate is in a second set of at least one data rate, wherein the protocol data unit comprises a preamble, a header, and a data field and wherein the header comprises a rate field indicating a data rate used for the data field and a rate feedback field indicating a data rate to use for feedback to provide second modulated output; and means for multiplexing, responsive to a control signal, to selectively provide the first modulated output if the data rate is in the first set of at least one data rate for IEEE 802.11b is selected or the second modulated output if the data rate is in the second set of at least one data rate is selected.

20. The apparatus of claim 19, wherein the means for performing FEC encoding, symbol mapping, and spectral spreading comprises means for performing FEC encoding, symbol mapping, and spectral spreading for the transmission if the data rate is less than 1 mega bits/second (Mbps).

21. The apparatus of claim 19, wherein the means for performing FEC encoding, symbol mapping, and spectral spreading for the transmission comprises means for encoding data for the transmission in accordance with a convolutional code, means for mapping encoded data to modulation symbols, and means for spectrally spreading the modulation symbols.

22. The apparatus of claim 19, wherein the means for selecting the data rate for the transmission comprises means for selecting the data rate for the transmission from the first set or the second set based on a range for the transmission.

23. An apparatus comprising:

a first processor operative to perform spectral despreading and differential demodulation for a first set of at least one data rate for IEEE 802.11b;

a second processor operative to perform spectral despreading, demodulation, and forward error correction (FEC) decoding for a second set of at least one data rate;

processing logic operative to receive a protocol data unit for a transmission, to process a header of the protocol data unit, to determine a data rate used for data sent in the protocol data unit, and to determine a data rate to use to send feedback; and a multiplexor circuit, responsive to a control signal, to selectively provide output from the first processor if the data rate is in the first set of at least one data rate for IEEE 802.11b is selected or output from the second processor if the data rate is in the second set of at least one data rate is selected.

24. The apparatus of claim 23, wherein the second set includes a data rate that is lower than a lowest data rate in the first set.

25. The apparatus of claim 23, wherein the first processor is operative to perform spectral despreading and differential demodulation for data rates of 1 and 2 mega bits/second (Mbps) in IEEE 802.11b.

26. The apparatus of claim 23, wherein the second processor is operative to perform spectral despreading, symbol demapping, and FEC decoding for data rates of 250 and 500 kilo bits/second (Kbps).

27. The apparatus of claim 23, wherein the second processor is operative to despread input symbols, to perform demodulation on despread symbols, and to perform FEC decoding on demodulated symbols in accordance with a convolutional code.

28. The apparatus of claim 27, wherein the second processor is operative to perform coherent demodulation on the despread symbols.

29. The apparatus of claim 27, wherein the second processor is operative to perform differential decoding on the demodulated symbols and to perform FEC decoding on an output of the differential decoding.

30. The apparatus of claim 23, further comprising:

a decoder operative to perform source decoding on an output from the first or second processor and to provide decoded data.

31. The apparatus of claim 23, further comprising:

processing logic operative to receive a protocol data unit for a transmission, to process a preamble of the protocol data unit, and to determine whether the transmission is for a data rate in the first set or the second set based on the preamble.

32. The apparatus of claim 23, further comprising:

processing logic operative to perform signal detection based on a fixed bit sequence sent in a preamble of a received protocol data unit.

33. The apparatus of claim 23, further comprising:

processing logic operative to derive a channel estimate based on a preamble or a channel estimation field, or both, in a received protocol data unit.

34. A method of receiving data in a wireless communication system, comprising:

determining a data rate for a transmission to be received;

performing spectral despreading and differential demodulation for the transmission if the data rate is in a first set of at least one data rate for IEEE 802.11b to provide first decoded output;

performing spectral despreading, demodulation, and forward error correction (FEC) decoding for the transmission if the data rate is in a second set of at least one data rate to provide second decoded output;

processing a header of the transmission to determine the data rate for the transmission and to determine a data rate to use to send feedback; and generating a control signal indicative of the data rate to control a multiplexor circuit, to selectively provide the first decoded output if the data rate is in the first set of at least one data rate for IEEE 802.11b or to provide the second decoded output if the data rate is in the second set of at least one data rate.

35. The method of claim 34, wherein the performing spectral despreading, coherent demodulation, and FEC decoding for the transmission comprises performing spectral despreading, symbol demapping, and FEC decoding for the transmission if the data rate is less than 1 mega bits/second (Mbps).

36. The method of claim 34, further comprising:
receiving a protocol data unit for the transmission;
processing a preamble of the protocol data unit; and
determining whether the transmission is for a data rate in the first set or the second set based on the preamble.

37. An apparatus comprising:
means for determining a data rate for a transmission to be received;
means for performing spectral despreading and differential demodulation for the transmission if the data rate is in a first set of at least one data rate for IEEE 802.11b to provide first decoded output;
means for performing spectral despreading, demodulation, and forward error correction (FEC) decoding for the transmission if the data rate is in a second set of at least one data rate to provide second decoded output;
means for processing a header of the transmission to determine the data rate for the transmission and to determine a data rate to use to send feedback; and
means for multiplexing, responsive to a control signal indicative of the data rate, to selectively provide the first decoded output if the data rate is in the first set of at least one data rate for IEEE 802.11b is selected or the second decoded output if the data rate is in the second set of at least one data rate is selected.

38. The apparatus of claim 37, wherein the means for performing spectral despreading, coherent demodulation, and FEC decoding for the transmission comprises means for performing spectral despreading, symbol demapping, and FEC decoding for the transmission if the data rate is less than 1 mega bits/second (Mbps).

39. The apparatus of claim 37, further comprising:
means for receiving a protocol data unit for the transmission;

means for processing a preamble of the protocol data unit; and means for determining whether the transmission is for a data rate in the first set or the second set based on the preamble.

40. A processor-readable instructions memory unit having software codes stored thereon for transmitting data in a wireless communication system, the software codes for:
selecting a data rate for a transmission;
performing differential modulation and spectral spreading for the transmission if the data rate is in a first set of at least one data rate for IEEE 802.11b to provide first modulated output;
performing processing of a protocol data unit, forward error correction (FEC) encoding, symbol mapping, and spectral spreading for the transmission if the data rate is in a second set of at least one data rate to provide second modulated output, wherein the protocol data unit comprises a preamble, a header, and a data field and wherein the header comprises a rate field indicating a data rate used for the data field and a rate feedback field indicating a data rate to use for feedback; and
generating a control signal indicative of the data rate to control a multiplexor circuit, to selectively provide the first modulated output if the data rate is in the first set of at least one data rate for IEEE 802.11b or to provide the second modulated output if the data rate is in the second set of at least one data rate.

41. A processor-readable instructions memory unit having software codes stored thereon for receiving data in a wireless communication system, the software codes for:
determining a data rate for a transmission to be received;
performing spectral despreading and differential demodulation for the transmission if the data rate is in a first set of at least one data rate for IEEE 802.11b to provide first decoded output;
performing spectral despreading, demodulation, and forward error correction (FEC) decoding for the transmission if the data rate is in a second set of at least one data rate; and
processing a header of the transmission to determine the data rate for the transmission and to determine a data rate to use to send feedback to provide second decoded output; and
generating a control signal indicative of the data rate to control a multiplexor circuit, to selectively provide the first decoded output if the data rate is in the first set of at least one data rate for IEEE 802.11b or to provide the second decoded output if the data rate is in the second set of at least one data rate.

* * * * *